United States Patent
Boss et al.

(10) Patent No.: US 8,223,156 B2
(45) Date of Patent: Jul. 17, 2012

(54) TIME DEPENDENT VIRTUAL UNIVERSE AVATAR RENDERING

(75) Inventors: Gregory J. Boss, American Fork, UT (US); Christopher J. Dawson, Arlington, VA (US); Peter G. Finn, Brampton (CA); Rick A. Hamilton, Charlottesville, VA (US); Clifford A. Pickover, Yorktown Heights, TX (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 12/238,514

(22) Filed: Sep. 26, 2008

(65) Prior Publication Data
US 2010/0079467 A1    Apr. 1, 2010

(51) Int. Cl.
*G06T 13/00* (2006.01)
*G09G 5/00* (2006.01)

(52) U.S. Cl. .......... 345/474; 345/633; 345/636

(58) Field of Classification Search .......... 345/473–474, 345/633, 636
See application file for complete search history.

(56) References Cited

U.S. PATENT DOCUMENTS

| 5,880,731 | A | * | 3/1999 | Liles et al. ..................... 715/758 |
| 7,006,098 | B2 | | 2/2006 | Bickmore et al. |
| 7,025,675 | B2 | | 4/2006 | Fogel et al. |
| 7,073,129 | B1 | | 7/2006 | Robarts et al. |
| 2007/0021200 | A1 | | 1/2007 | Fox et al. |
| 2007/0113181 | A1 | * | 5/2007 | Blattner et al. ............... 715/706 |
| 2010/0057715 | A1 | * | 3/2010 | Bates et al. ...................... 707/5 |

FOREIGN PATENT DOCUMENTS
WO    2007120981    10/2007

* cited by examiner

*Primary Examiner* — Said Broome
*Assistant Examiner* — Wynton S Jones
(74) *Attorney, Agent, or Firm* — Patrick J. Daugherty; Driggs, Hogg, Daugherty & Del Zoppo Co., LPA

(57) ABSTRACT

Methods, devices, program products and systems are disclosed for displaying multiple virtual universe avatar states. Each of a plurality of avatar states of a first avatar of a first virtual universe user are stored in a storage medium as a function of a time of each state. A first avatar is displayed in a current state to a second user of an engaging second avatar, the engaging instigating a selecting and a retrieving of a subset of plurality of states from the storage medium, each of the subset states different from each other and the current state. Selected subset states are visually displayed to the second user, each of the displayed states visually distinct from another and the current state. The first avatar current state is stored in the storage medium associated with the engagement.

17 Claims, 2 Drawing Sheets

TIME DEPENDENT VIRTUAL UNIVERSE AVATAR RENDERING

FIELD OF THE INVENTION

The present invention generally relates to displaying divergent state information associated with Virtual Universe avatars, and more particularly to methods, systems, and program products for enabling Virtual Universe users to view divergent avatar states for different periods of time.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users through the use of an avatar, a graphical representation of the user often taking the form of a cartoon-like human though any graphic image may be utilized. In order to participate within or inhabit a VU a user creates an agent which functions as the user's account, and upon which the user builds an avatar tied to an inventory of assets the user owns in the VU and associated with the agent.

VU assets, avatars, the VU environment, and anything presented to a user as visual information comprise Universally Unique Identifiers (UUID's) tied to geometric data distributed to users as textual coordinates, textures distributed to users as graphics files (in some examples as a JPEG2000 file) and effects data rendered by the user's client computer according to the user's preferences and user's computer system device capabilities. Many VU's are represented using three dimensional (3-D) graphics and landscapes and are populated by many thousands of users or "residents," often resembling the real world or fantasy/fictional worlds in terms of physics, houses, landscapes and in interpersonal communications with other users.

Large robust VU's and massively multiplayer online games, such as for example Second Life® (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc in the United States, other countries, or both), and There™ (THERE is a trademark of Makena Technologies, Inc. in the United States, other countries, or both) render and display detailed, large and complex graphic environments within which users may travel and participate as if a character in an expressionistic or fantastical fictional world or within a realistic or representational approximation of real life.

VU's are also commonly defined with respect to VU regions, virtual areas of land within the VU typically residing on a single server, with each region amenable to provision and management by a one or more participating providers. The size and complexity and variety of resources found in a VU are related to the number of providers participating and hosting regions through server hosting. And the success of a VU may depend upon attracting users and keeping them engaged and participating in the VU environment, thereby adding value to the providers who bear the cost in providing VU region content and services (and correspondingly expect an appropriate level of multiple-user engagement as a return on their investment), as well as for other users who wish to engage many others in a large virtual community. For example an informational or service-related region managed by a governmental or non-profit organization may desire or expect a given level of VU user engagement and participation, and commercial region providers may desire to engage in a given level of commercial transactions (e.g. sales) or achieve a level of marketing exposure among VU users.

VU users typically identify and recognize other user avatars in business and social interactions by recognition of avatar visual aspects such as character facial features, height, clothing, skin color and tone, body girth, etc, in some respects as people in real life recognize other people. More particularly, real world people and VU avatars may be readily distinguished by distinctive features or feature combinations unique to the person or avatar, and thus notorious or previously met avatars may be easily identified in subsequent social interactions. However, in contrast to the real world, virtual world users have the ability to easily and drastically change their avatar attributes. In many VU applications a user can rapidly change avatar attributes generally held constant in real people such as height, facial features, skin color or ethnicity, or may even replace an avatar character with another entirely different character (for example replacing a human with a dragon), and such changes may be effected multiple times through many avatar iterations. Though such changes may be desirable for enhancing user enjoyment, they may cause problems in interactions with other users, sometimes making subsequent recognition of a user represented by the altered avatar impossible. For example, a sale or other revenue generation opportunity may be missed through lack of customer recognition, perhaps ignoring or inappropriately engaging an avatar of a key customer, partner or associate, one who would have received differentiated treatment had they been able to recognize the user through his avatar. In social situations, missed opportunities to collaborate and interact can similarly be missed because of a lack of recognition of a changed avatar. Additionally, in a gaming environment missed opportunities to create quest groups, clans, or other similar parties can occur because other appropriate and geographically close avatars were not recognizable.

Identity confusion from changing avatar appearances is addressed in some prior art VU application environments by displaying a static character or user name or identification (ID) in a textual display associated with an avatar, for example as a text name/ID constantly displayed as floating above the head of the avatar, wherein the name remains unchanged through any avatar appearance alterations. Some VU environments also allow a user to maintain a "friends" list which enables a user to add other users to a personal list, wherein the list may be used to find added users presently active in the VU by showing the status of listed users (e.g. off-line, on-line, temporarily away, etc.) and even their location in the VU if presently active, for example providing a text description of the land or region another active user's avatar is occupying and/or a locator beacon on a map showing their location.

However, such solutions are deficient in a number of respects. In one aspect these text-based solutions don't enable a VU user to recognize other VU users through outward avatar appearance, as they would recognize a person in the real world, requiring instead the user to read and accurately process text information associated with a user avatar in order to identify the user. Visual appearance is often the best reminder of known avatar identity, and sometimes the only sufficient indicator in the case of people who have difficulty in remembering names but more easily recall a face or other unique visual characteristic; thus without visual consistency avatar recognition may fail from text name or ID information alone.

Moreover, the display of floating names/ID detracts from the three-dimensional alternate world experience of the VU environment, reminding the user that he is engaging a two-dimensional computer-interface and thus interfering with a user's immersion into the VU world. Name/ID displays may also be difficult to correctly or efficiently display, resulting in a cluttered display environment when there are many avatars displayed at once, or even display failures caused by overlapping names in the case of avatars standing next to each other.

In another aspect the appearance of a user avatar does not generally reveal the experience or history of the associated user, nor does an object reveal its historic values and attributes. Appearances may be manipulated or altered for deceptive reasons. For example, an experienced gamer may choose a beginner or basic character avatar or evince novice movements, responses or other behaviors in order to conceal his true experience and abilities and thereby gain advantage over other users. Users may also distance themselves from prior bad actions and reputations by starting over with new avatars, perhaps deceiving the same users again in subsequent business engagements. The value of an object may be hard to determine without knowledge of prior history of the object, and problems arise in accurately assessing the trustworthiness of representations made about the history of the object by others relevant to valuing the object.

SUMMARY OF THE INVENTION

Methods for displaying multiple virtual universe avatar states are provided. In the methods each of a plurality of avatar states of a first avatar of a first virtual universe user are stored in a storage medium as a function of a time of each state. The first avatar is displayed in a current state to a second user of an engaging second avatar, the engaging instigating a selecting and a retrieving of a subset of plurality of states from the storage medium, each of the subset states different from each other and the current state. Selected subset states are visually displayed to the second user, each of the displayed states visually distinct from another and the current state. The first avatar current state is stored in the storage medium associated with the engagement.

In another aspect, service methods are provided comprising deploying applications for displaying multiple virtual universe avatar states according to method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for displaying multiple virtual universe avatar states. Moreover, systems, articles and programmable devices configured for performing one or more method and/or process elements of the current invention are also provided for displaying multiple virtual universe avatar states, for example as described above.

BRIEF DESCRIPTION OF THE DRAWINGS

These and other features of this invention will be more readily understood from the following detailed description of the various aspects of the invention taken in conjunction with the accompanying drawings in which.

Figure 1:
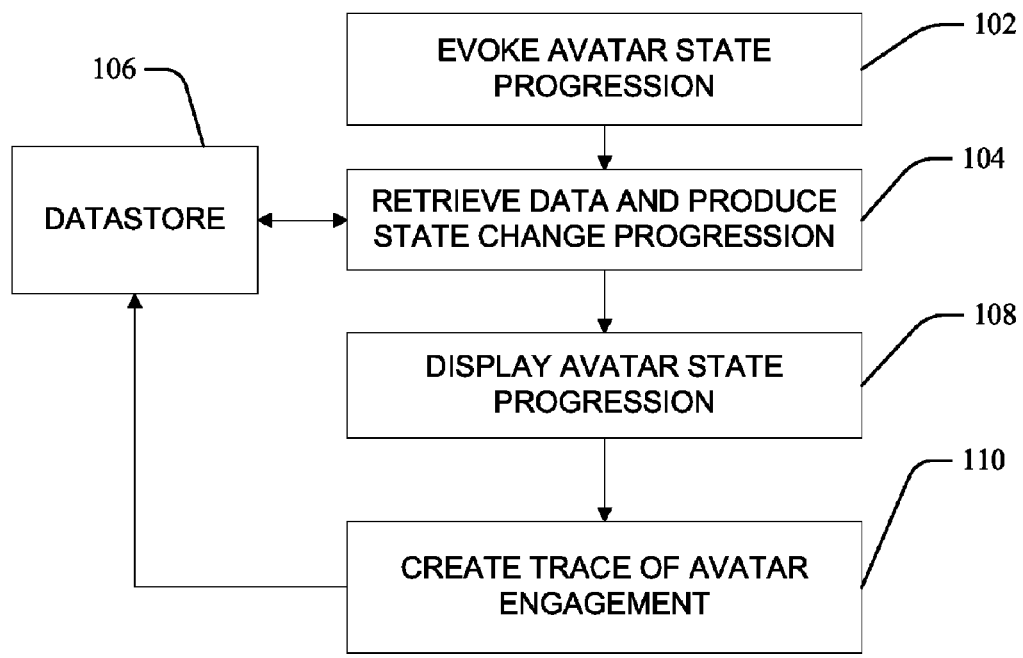
FIG. 1 is a flow chart illustrating a process and system for displaying multiple time-dependent states of a virtual universe avatar according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description; and
II. Computerized Implementation.

I. General Description

Referring now to FIG. 1, a method and process for displaying virtual universe (VU) user avatar appearance state changes is illustrated. Pursuant to a social engagement of a first VU user avatar and a second VU user avatar in a VU world or environment, at 102 the VU first user activates a display of state changes of the second users' avatar or object associated with the second user avatar as a function of time, the second user avatar or object having a plurality of divergent states each associated with a specific time value.

More particularly, evoking the display of state changes at 102 causes retrieval of historic data associated with the second user avatar or object at 104 from a data storage means, medium or datastore 106. Using the retrieved data and also optionally as a function of first user inputs and preferences, at 108 one or more second user/object avatar state changes are displayed to the first user. The states may comprise visual and non-visual characteristics, attributes or abilities of the second user avatar or object, and the states are rendered into a visual display that enables the first user to distinguish between state values. Examples of revealing a state change comprise showing a different character used to represent the second user avatar in the past, or showing another likely future character or appearance aspect extrapolated from the past progression of one or more aspects of the second user avatar to date. Non-visual attributes such as financial values of divergent states may be rendered in graphic or tabular form, quickly conveying to the first user the divergent states values as a function of time.

At the end of engagement by the first user with the second user/object at 110, or in response to some other event (such as a periodic save command iteration), data indicative of the current engagement time and state of the second user's avatar is saved to the datastore 106 for use with future state change display evocations at 102. Avatar and object attribute data is thus saved to the datastore 106 with respect to each specific interaction between two users, and optionally with respect to multiple time iterations during any engagement, in one aspect enabling subsequent state displays as a function of time or state changes of either avatar between the current and future and past interactions.

Figure 2:
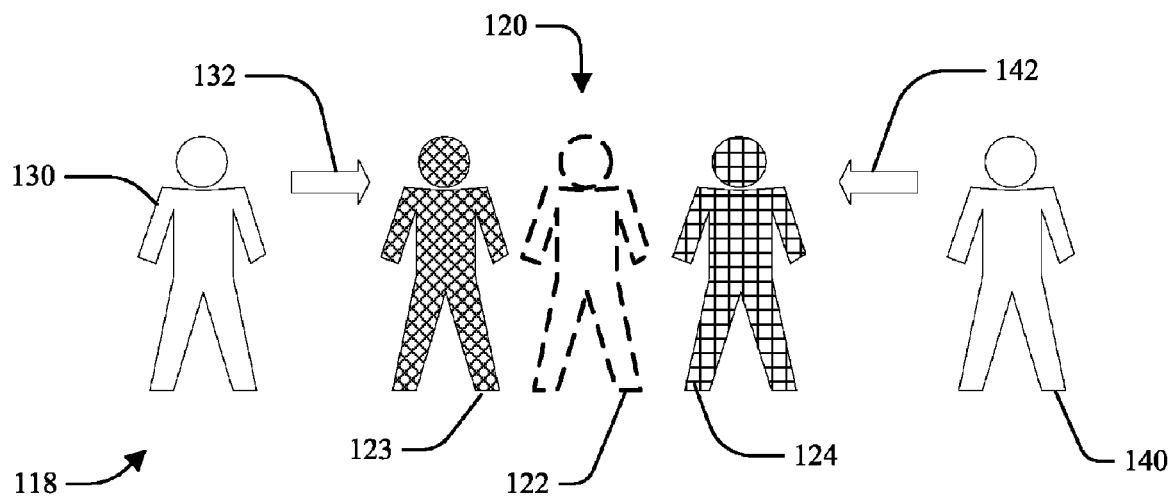
FIG. 2 is a block diagram illustration of displaying multiple time-dependent states of a virtual universe avatar in an engagement with other virtual universe avatars according to the present invention.

FIG. 2 provides an illustration of an avatar state progression according to the present invention within a virtual universe domain 118, for example pursuant to a method of process of FIG. 1 as described above. A second virtual universe domain avatar 120 in a current state 122 is engaged by a first virtual universe domain avatar 130 and a third virtual universe domain avatar 140, activating a display of state changes 123 and 124 of the second avatar to each of the first avatar 130 and the third avatar 140, respectively. Thus a previous state 123 of the second avatar 120 associated as a function of time with a previous engagement of the first avatar 130 is retrieved and displayed to a user of the first avatar 130 through a virtual universe domain rendering 132. Simultaneously, another different previous state 124 of the second avatar 120 associated as a function of time with a previous engagement of the third avatar 140 is retrieved and displayed to a user of the third avatar 140 through a virtual universe domain rendering 142.

A user of an engaging avatar may initiate a display of state changes described above with respect to FIGS. 1 and 2, for example at 102 of FIG. 1, by moving the engaged avatar or other object to a specific state-change region defined within the VU, wherein bringing the engaged avatar/object within the state-change region automatically invokes, or enables a manual evocation, of state change data retrieval at 104 and change displays at 108. State change displays may also be invoked or displayed through a temporary secondary window view provided within the user's client application display, or through an overlay view that enables state changes to be viewed dynamically as an overlay to the existing avatar.

Examples of state changes appropriate for visual display include avatar appearance attributes such as character, ethnicity and other facial features, hair, clothing, and visually indicated powers and capabilities, as well as non-visual attributes that be rendered or represented in a graphic format such as graph or table displays of virtual or real-world monetary values, avatar inventory history and sub-unit counts; other attributes useful for state change tracking and display will also be apparent to one skilled in the art.

An engaging avatar user may further specify a time/date range or view a predetermined or default time/date range, thus narrowly focusing the state change information to one or more periods of interest. For example by storing a previous N number of divergent state observations relative to an avatar or an object in the datastore 106, where N may be VU provider and/or user selectable, the engaging user is enabled to review any of the N prior versions of avatar or object states without having to actively or explicitly track those states. This provides advantages in one aspect by enabling useful data accumulation independent of engaging users activities within the VU, and thus extending the knowledge of the engaging user to state information otherwise outside of the actual engaging experiences of the engaging user, including user/object state changes occurring prior to the engagement of an avatar or object or with the VU environment itself, as well as intervening state changes that may occur between engagements or while a user is logged off.

Display of avatar or object state changes may comprise a graphic playback of one or more state changes, for example in a video image display with optional morphing techniques configured to smooth out and interpolate gaps between one state change and the next. In one embodiment a first user may play back the time displacement of the second user's avatar over the past two weeks by viewing a ten second video that shows the progression of the second user avatar's changes.

Display of state changes may also comprise representations of other data generally not associated with the avatar or object appearance. For example, playback and display of state changes may comprise visual representations of avatar inventory, financial data including graphs of funds held, or market value of an object or inventory items, each as a function of time. Thus in one example the first user may display changes in value for a virtual object as set and observed each time the virtual object was sold by one player to another, thus playing back the values or viewing a graph of the values as function of time through their purchases and/or as designated by each prior owner during their ownership. VU objects representing real world objects, such as an automobile offered for sale, could be rolled back to show the real values that vehicle sold for or to show the condition of the vehicle as it progressed through accidents, wear and tear, and repairs.

Figure 3:
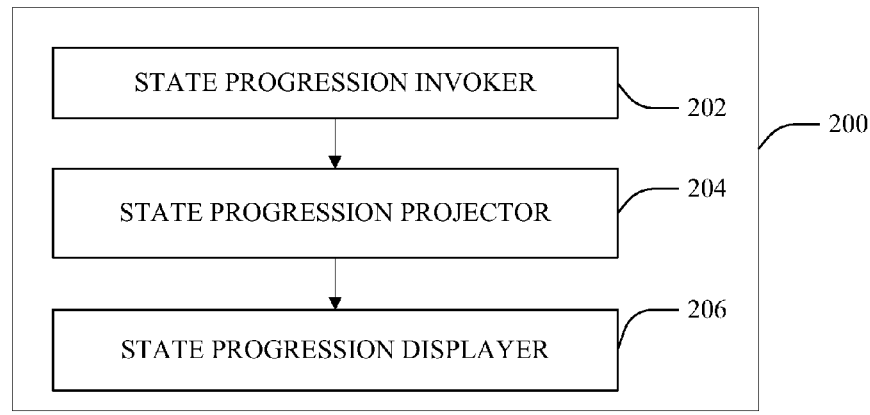
FIG. 3 is a block diagram illustration of an avatar state progression machine according to the present invention.

FIG. 3 illustrates a VU user progressive state machine 200 configured according to the present invention, for example configured to perform the process steps 102/104/108/110 described above with respect to FIGS. 1 and 2. Thus the progressive state machine 200 has a state progression invoker logic component 202, a state progression projector logic component 204 and state progression displayer logic component 206, the functions of each readily apparent by reference to the discussion above, including with respect to the processes illustrated in FIGS. 1 and 2.

Displaying a different or divergent avatar state of a second user avatar or object may be a function of data specific to a prior encounter of the first and second avatars. In a typical scenario within a social VU environment the appearance of a user's avatar is a primary means for recognition of that user by other users. Since any user may change their avatar, sometimes frequently, recognition of friends or other prior acquaintances in subsequent meetings may be problematic. Thus a VU User 1 may have a prior virtual world engagement with a User 2 avatar when User 2's avatar has light-colored skin, dark hair and an extremely tall height (a User 2 avatar State 1). However, two days later User 2 shortens and widens his avatar (a User 2 avatar State 2), then three weeks later changes his avatar's hair color to blond (a User 2 avatar State 3), and finally six weeks later makes his avatar's skin color more tan(User 2 avatar State 4). User 1 may fail to recognize User 2 during subsequent encounters during any of the later User 2 avatar States 2, 3 or 4, perhaps walking right by the User 2's without acknowledgement if User 2 does not realize that changes to his avatar have rendered it unrecognizable to User 1, and User 2 may erroneously believe that User 1 is intentionally snubbing User 2 during a subsequent encounter.

In contrast, the present invention enables User 1 to invoke state changes playback in any subsequent engagements with User 2 and thereby recognize him at any subsequent state. In one example if a User A's last interaction with a User B was at a time when User B's Avatar was in a State 1, then the next time User A interacts with or is in the same geographic location with User B, User B's avatar will be as displayed to User A in conformance with and as a function of the prior interaction, namely as it appeared in State 1, and this may be accomplished even if User B's avatar has since progressed through multiple subsequent state changes (for example is presently in a State 5 display state).

In some embodiments progressive state display (for example at 108 of FIG. 1 or by the state progression display component 206 of FIG. 3) may have a "single instance playback" configuration wherein in their present interaction the User B avatar quickly progresses through each state iteration (thus from State 1 to State 2 and on to State 5) so that User A is informed of each previous intervening state iteration executed by User B's avatar to arrive at the present State 5 appearance. In some embodiments states relevant to prior engagements may be distinguished from others: thus in one example where User A has encountered User B in State 1 and State 3, then a single instance playback of User B distinctively highlights States 1 and 3 as prior engagement or meeting states while displaying each of the States 1 through 5.

In some examples state-change review may be applied to any other user in the VU, though it may also be restricted or initiated by permissions, for example restricted to other users specifically added to one or more lists, such as "friends," "customers," "employees," etc, or to those who have authorized prior state displays. Evoking progressive state displays may be dependent upon prior engagement history, for example triggering an automatic scrolling through previously engaged avatar states when a user having a divergent present appearance enters the VU environment within a visual display proximity of a user's avatar. Such embodiments help trigger recognition for casual acquaintances and prior customer contacts upon a subsequent meeting, enabling a polite greeting rather than an unintended snub, as well as equalizing knowledge between users by providing a user who does not remember or recognize another user from being at a social, business, or competitive gaming disadvantage.

A user avatar may also present multiple divergent state change instance playback displays simultaneously, each display selected as a function of a specific engaging other user avatar. Thus a user avatar may simultaneously project multiple and divergent "personalities" or attributes to different other users: in one example if a User C's avatar and a User D's avatar are both engaging/talking with a User B's avatar, User C may see User B's avatar in State 4 and User D may simultaneously see User B in State 2, the respective projected states selected as a function of enabling User A to see User B's avatar as it was the last time User A interacted with User B (namely State 1) while at the same time enabling User C to see User B in State 2, the last state known between User C and B avatars.

State change histories may also be displayed automatically or manually, and in response to any first user preferences or needs independent of prior encounter history. Thus state changes may be displayed in temporary "roll backs" for informational or educational purposes; in some player-vs.-player gaming VU environment examples a second user opponent may allow (or be required to allow, or pursuant to some other condition or permission configuration) the first user to activate a state change progression display (for example by dragging the second user's avatar to a roll-back place or region or querying through a graphical user interface window or menu at 102). Thus the first user may view historical changes to the second user's avatar character's skills, talents, spells, armor, in one aspect enabling the first user to verify representations by the second user as to past history or present status. In another aspect the first user may learn from studying the history of the second user, identifying which combinations of applied or learned characteristics have been advantageous in the development of the second user, particularly for skilled or difficult-to-beat opponents, the first user thus enabled to apply knowledge of how the second user got to a certain position or configuration in modifying and configuring his own avatar character.

In another aspect non-appearance attributes, such as the social network or financial status of a company or individual associated with a VU avatar, object or texture, maybe be revealed or transformed or temporarily displaced by evoking the state change progression display at 102 and providing past and projected state change data. For example, a first user may request to see a financial/value information state status N days ago of a second prospective purchaser user in order to asses his creditworthiness. Such embodiments would also have applications in an auction-type of environment or transaction, enabling a first user to display a graph of the value that other prior owners' placed on an object at auction through that object's lifetime (both within and without the VU environment), thereby helping to determine appropriate opening or maximum bids or avoid overvaluing the object and overbidding. Evoking a state change progression display may also cause the object to be compared with other associated or similar objects in order to obtain and determine additional valuation data (for example, determining average, mean or aggregate values of the object with the associated or similar objects). In some examples valuation data may also focus on user-specified time periods or other data subset definitions: for example, displaying tabular or graphic displays of how much all objects of the same type sold for in a specific region of the virtual world over the past N days. Other user-defined parameters appropriate for practice with the present invention will also be apparent to one skilled in the art.

II. Computerized Implementation

Figure 4:
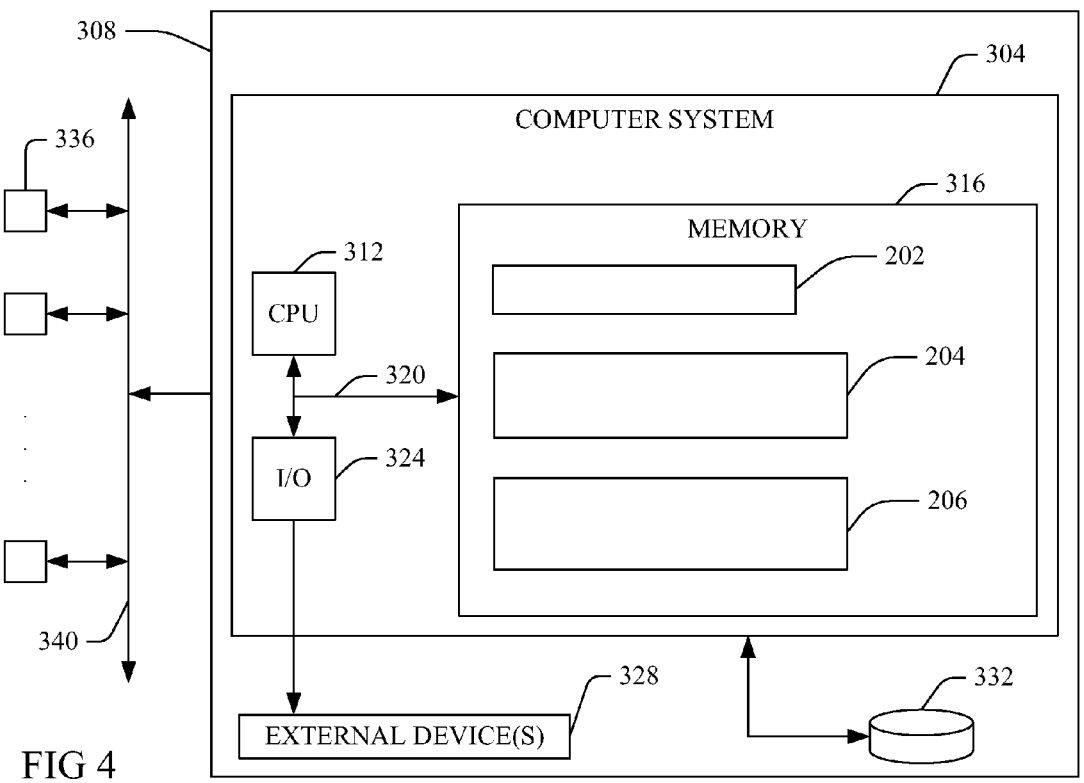
FIG. 4 is a block diagram illustrating an exemplary computerized implementation of a system and method for displaying multiple time-dependent states of a virtual universe avatar according to the present invention.

The present invention may be implemented using conventional software tools and methods applicable to virtual universes, for example within a stand-alone VU application, or as a plug-in to an existing VU application. The system and mechanisms described could be implemented in a hosting system or grid for a virtual universe or in client software for the virtual universe installed on a user's personal computer or other programmable device. Referring now to FIG. 4, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of processes and systems for evoking display of multiple time-dependent virtual universe avatar states illustrated in FIGS. 1-3 and described above, including a state progression invoker logic component 202, a state progression projector logic component 204 and a state progression displayer logic component 206 discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware. To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 an be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to invoke display of multiple time-dependent virtual universe avatar states. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation could be deployed, managed, serviced, etc. by a service provider who offers to implement, deploy, and/or perform the functions of the present invention for evoking display of multiple time-dependent virtual universe avatar states, for example by licensing methods and browser or application server technology according to the present invention to a virtual universe world or region provider, an internet service provider (ISP) or a cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 308 that performs the process steps of the invention for evoking display of multiple time-dependent virtual universe avatar states, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for displaying multiple virtual universe avatar states, comprising:
  a second avatar of a second virtual universe user engaging a first avatar of a first user in a virtual universe domain, wherein the engaged first avatar is graphically displayed to the second user in an initial visual appearance state comprising an initial appearance of a visual attribute;
  selecting and retrieving at least one other prior engagement visual appearance state of the first avatar as a function of an associated time of a prior engagement, wherein the at least one other prior engagement visual appearance state was visually displayed to the second avatar user within the virtual universe domain during the associated prior engagement with the first avatar and comprises another appearance of the visual attribute that is different from and visually distinct from the initial appearance of the visual attribute, wherein the at least one another visual appearance state is selected from at least one previous appearance state of the first avatar stored in a storage medium, wherein each of the at least one previous appearance states have different visually and distinct display appearances of the visual attribute and are stored in the storage medium in association with different respective times that they were visually displayed to a user within the virtual universe domain;

graphically displaying the engaged first avatar to the second user in the selected and retrieved at least one other visual appearance state to the second user in association with the time of the prior engagement; and storing the initial visual appearance of the first avatar in the storage medium associated with a time of display of the initial visual appearance state to the second avatar during the engaging.

2. The method of claim 1, wherein the at least one previous appearance state of the first avatar is a plurality of previous appearance states comprising an intervening state of the first avatar associated with an intervening time between the current engagement time and the time of the prior engagement; and wherein the method further comprises:

displaying the intervening avatar state in association with the intervening time and visually distinct from the displaying of the prior engagement visual state of the first avatar during the prior engagement and the current initial visual state.

3. The method of claim 2, further comprising:

displaying each of the initial, intervening and prior engagement visual appearance states in response to the second user scrolling through each of the first avatar initial intervening and prior engagement visual appearance states.

4. The method of claim 2, further comprising:

a third avatar of a third virtual universe user engaging the first avatar simultaneously with the engaging of the second user avatar;

the engaging with the third avatar instigating a selecting and a retrieving of a visual appearance state of the first avatar from the storage medium that was visually displayed to the third avatar during a prior engagement of the first avatar with the third avatar and that is stored in the storage medium in association with a time of the prior engagement with the third avatar, wherein the retrieved third avatar prior engagement visual appearance state is different and visually distinct from the first avatar initial and second avatar prior engagement visual appearance state; and visually displaying the first avatar in the retrieved third avatar prior engagement visual appearance state to the third user while simultaneously displaying the first avatar initial or the second avatar prior engagement visual appearance states to the second user.

5. The method of claim 2, wherein the second avatar engaging the first avatar comprises the second avatar moving within a proximity distance of the first user within a graphic virtual universe display domain of the second user, the moving within the proximity distance automatically instigating the selecting and the retrieving of the first avatar initial, intervening and prior engagement visual appearance states.

6. The method of claim 2, further comprising:

visually displaying the first avatar initial, intervening and prior engagement visual appearance states to the second user in response to the first avatar moving into a state progression display area within a graphic virtual universe display domain of the second user.

7. The method of claim 2, further comprising the second user specifying a time period, wherein the selecting and the retrieving of the first avatar initial, intervening and prior engagement visual appearance states is a function of their respective associated times being within specified time period.

8. The method of claim 2, wherein the visually distinct visual attribute comprises at least one of visually distinct character facial feature, height, clothing, skin color, skin tone, body girth, body height, hair and indicated character capability attributes.

9. A method for providing a service for displaying multiple virtual universe avatar states, the method comprising:

providing a computer infrastructure comprising a processing unit in communication with a computer readable memory and a tangible computer-readable storage device, wherein the processing unit, when executing program instructions stored on the tangible computer-readable storage device via the computer readable memory:

in response to a second avatar of a second virtual universe user engaging a first avatar of a first user in a virtual universe domain, graphically displays the engaged first avatar to the second user in an initial visual appearance state comprising an initial appearance of a visual attribute;

selects and retrieves at least one other prior engagement visual appearance state of the first avatar as a function of an associated time of a prior engagement, wherein the at least one other prior engagement visual appearance state was visually displayed to the second avatar user within the virtual universe domain during the associated prior engagement with the first avatar and comprises another appearance of the visual attribute that is different from and visually distinct from the initial appearance of the visual attribute, wherein the at least one another visual appearance state is selected from at least one previous appearance state of the first avatar stored in a storage medium, wherein each of the at least one previous appearance states have different visually and distinct display appearances of the visual attribute and are stored in the storage medium in association with different respective times that they were visually displayed to a user within the virtual universe domain;

graphically displays the prior engagement visual appearance state of the first avatar during the prior engagement to the second user in association with the time of the prior engagement; and stores the initial visual appearance of the first avatar in the storage medium associated with a time of display of the initial visual appearance state to the second avatar during the engagement.

10. The method of claim 9, wherein the least one previous appearance state of the first avatar is a plurality of previous appearance states comprising an intervening state of the first avatar associated with an intervening time between the current engagement time and the time of the prior engagement; and wherein the processing unit, when executing the program instructions, further:

displays the intervening avatar state in association with the intervening time and visually distinct from the displaying of the prior engagement visual state of the first avatar during the prior engagement and the current initial visual state.

11. The method of claim 10, wherein the visually distinct visual attribute comprises at least one of visually distinct character facial feature, height, clothing, skin color, skin tone, body girth, body height, hair and indicated character capability attributes.

12. An article of manufacture, comprising:
a computer readable tangible storage device having computer readable program code embodied therewith, the computer readable program code comprising instructions that, when executed by a computer processor, cause the computer processor to:
in response to a second avatar of a second virtual universe user engaging a first avatar of a first user in a virtual universe domain, graphically display the engaged first avatar to the second user in an initial visual appearance state comprising an initial appearance of a visual attribute;
select and retrieve at least one other prior engagement visual appearance state of the first avatar as a function of an associated time of a prior engagement, wherein the at least one other prior engagement visual appearance state was visually displayed to the second avatar user within the virtual universe domain during the associated prior engagement with the first avatar and comprises another appearance of the visual attribute that is different from and visually distinct from the initial appearance of the visual attribute, wherein the at least one another visual appearance state is selected from at least one previous appearance state of the first avatar stored in a storage medium, wherein each of the at least one previous appearance states have different visually and distinct display appearances of the visual attribute and are stored in the storage medium in association with different respective times that they were visually displayed to a user within the virtual universe domain;
graphically display the prior engagement visual appearance state of the first avatar during the prior engagement to the second user in association with the time of the prior engagement; and
store the initial visual appearance of the first avatar in the storage medium associated with a time of display of the initial visual appearance state to the second avatar during the engagement.

13. The article of manufacture of claim 12, wherein the least one previous appearance state of the first avatar is a plurality of previous appearance states comprising an intervening state of the first avatar associated with an intervening time between the current engagement time and the time of the prior engagement; and
wherein the computer readable program code instructions, when executed by the computer processor, further cause the computer processor to display the intervening avatar state in association with the intervening time and visually distinct from the displaying of the prior engagement visual state of the first avatar during the prior engagement and the current initial visual state.

14. The article of manufacture of claim 13, wherein the visually distinct visual attribute comprises at least one of visually distinct character facial feature, height, clothing, skin color, skin tone, body girth, body height, hair and indicated character capability attributes.

15. A system, comprising:
a processing unit in communication with a computer readable memory and a tangible computer-readable storage device;
wherein the processing unit, when executing program instructions stored on the tangible computer-readable storage device via the computer readable memory:
in response to a second avatar of a second virtual universe user engaging a first avatar of a first user in a virtual universe domain, graphically displays the engaged first avatar to the second user in an initial visual appearance state comprising an initial appearance of a visual attribute;
selects and retrieves at least one other prior engagement visual appearance state of the first avatar as a function of an associated time of a prior engagement, wherein the at least one other prior engagement visual appearance state was visually displayed to the second avatar user within the virtual universe domain during the associated prior engagement with the first avatar and comprises another appearance of the visual attribute that is different from and visually distinct from the initial appearance of the visual attribute, wherein the at least one another visual appearance state is selected from at least one previous appearance state of the first avatar stored in a storage medium, wherein each of the at least one previous appearance states have different visually and distinct display appearances of the visual attribute and are stored in the storage medium in association with different respective times that they were visually displayed to a user within the virtual universe domain;
graphically displays the prior engagement visual appearance state of the first avatar during the prior engagement to the second user in association with the time of the prior engagement; and
stores the initial visual appearance of the first avatar in the storage medium associated with a time of display of the initial visual appearance state to the second avatar during the engagement.

16. The system of claim 15, wherein the least one previous appearance state of the first avatar is a plurality of previous appearance states comprising an intervening state of the first avatar associated with an intervening time between the current engagement time and the time of the prior engagement; and
wherein the processing unit, when executing the program instructions stored on the computer-readable storage medium via the computer readable memory, further displays the intervening avatar state in association with the intervening time and visually distinct from the displaying of the prior engagement visual state of the first avatar during the prior engagement and the current initial visual state.

17. The system of claim 16, wherein the visually distinct visual attribute comprises at least one of visually distinct character facial feature, height, clothing, skin color, skin tone, body girth, body height, hair and indicated character capability attributes.

* * * * *